(No Model.) 3 Sheets—Sheet 1.

J. C. AYER.
APPARATUS FOR REGISTERING THE FLOW OF FLUIDS AND DETECTING WASTE.

No. 318,227. Patented May 19, 1885.

WITNESSES
W. J. Cambridge
W. Seagle

INVENTOR
J. Cullen Ayer
Chas. F. Teschemacher
Atty (No Model.)  3 Sheets—Sheet 2.

J. C. AYER.
APPARATUS FOR REGISTERING THE FLOW OF FLUIDS AND DETECTING WASTE.

No. 318,227.  Patented May 19, 1885.

WITNESSES
W. J. Cambridge
W. Deajos

INVENTOR
J. Cullen Ayer (No Model.) 3 Sheets—Sheet 3.

J. C. AYER.
APPARATUS FOR REGISTERING THE FLOW OF FLUIDS AND DETECTING WASTE.

No. 318,227. Patented May 19, 1885.

WITNESSES
W. J. Cambridge
W. Deagod

INVENTOR
J. Cullen Ayer

UNITED STATES PATENT OFFICE.

J. CULLEN AYER, OF BOSTON, MASSACHUSETTS.

APPARATUS FOR REGISTERING THE FLOW OF FLUID AND DETECTING WASTE.

SPECIFICATION forming part of Letters Patent No. 318,227, dated May 19, 1885.

Application filed June 20, 1884. (No model.)

*To all whom it may concern:*

Be it known that I, J. CULLEN AYER, a citizen of the United States, residing at Boston, in the county of Suffolk and State of Massachusetts, have invented an improved method of and apparatus for registering the quantity or volume of fluid passing through a pipe and detecting any waste or unnecessary flow of said fluid, of which the following is a full, clear, and exact description, reference being had to the accompanying drawings, making part of this specification, in which—

Figure 1:
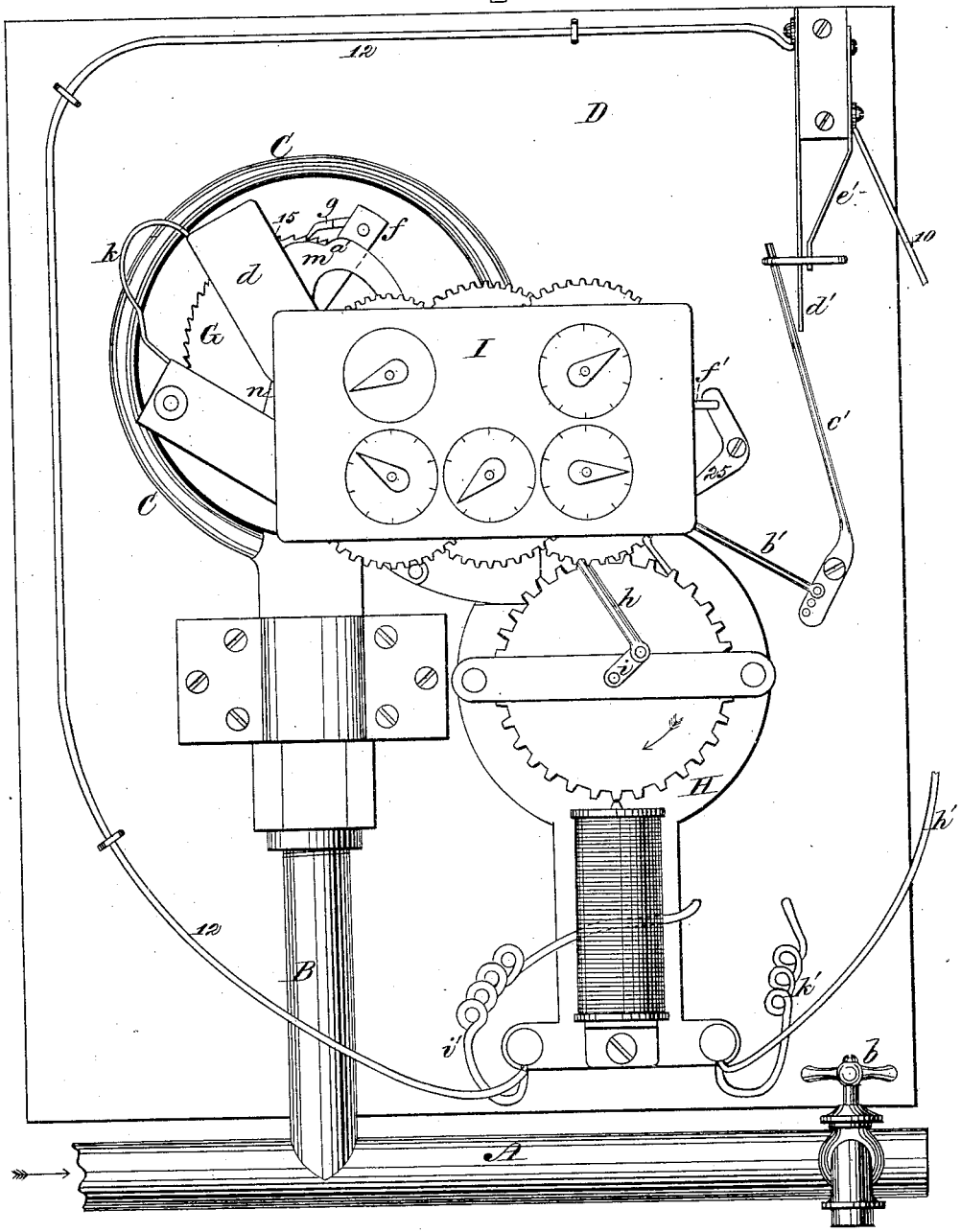
Figure 2:
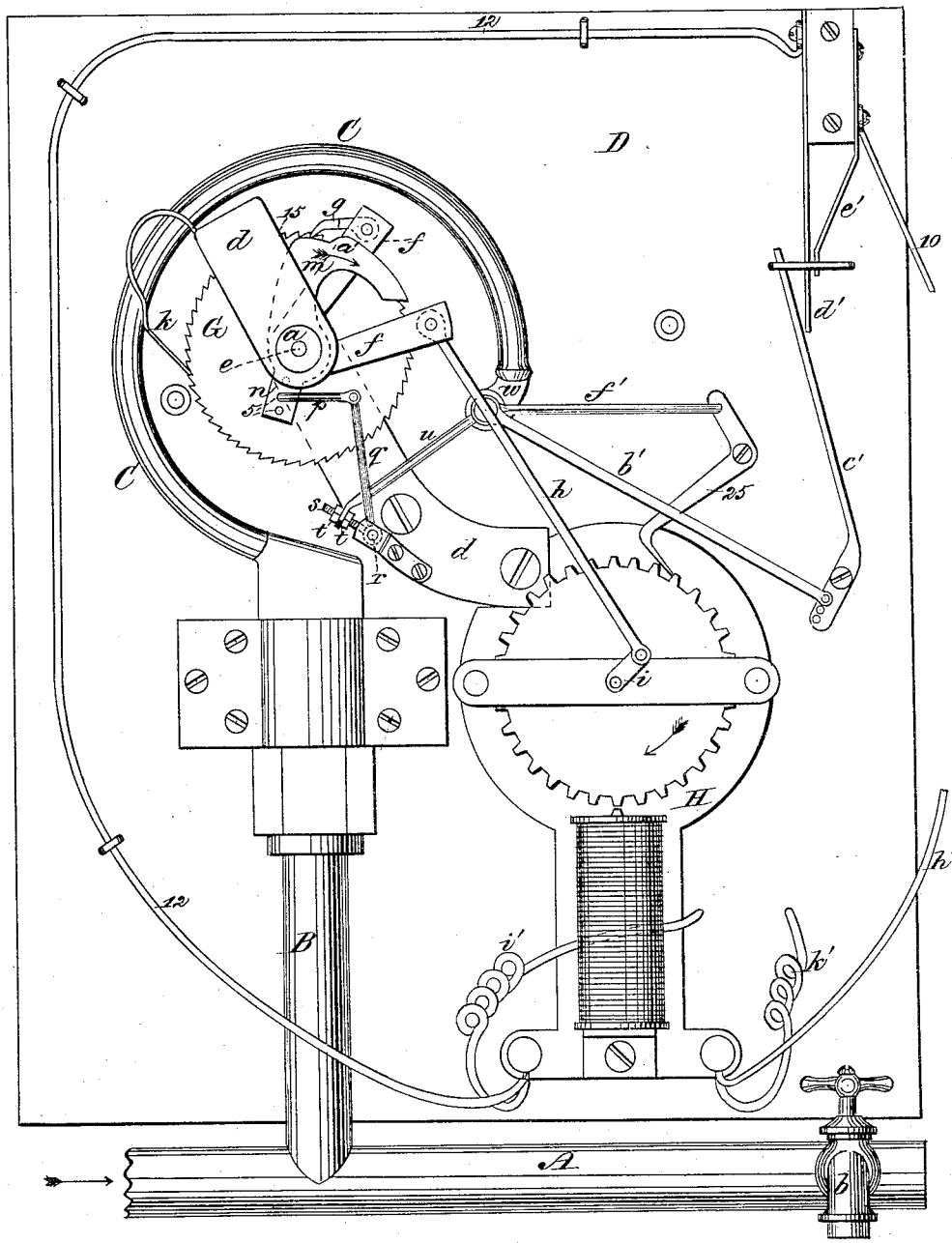
Figure 3:
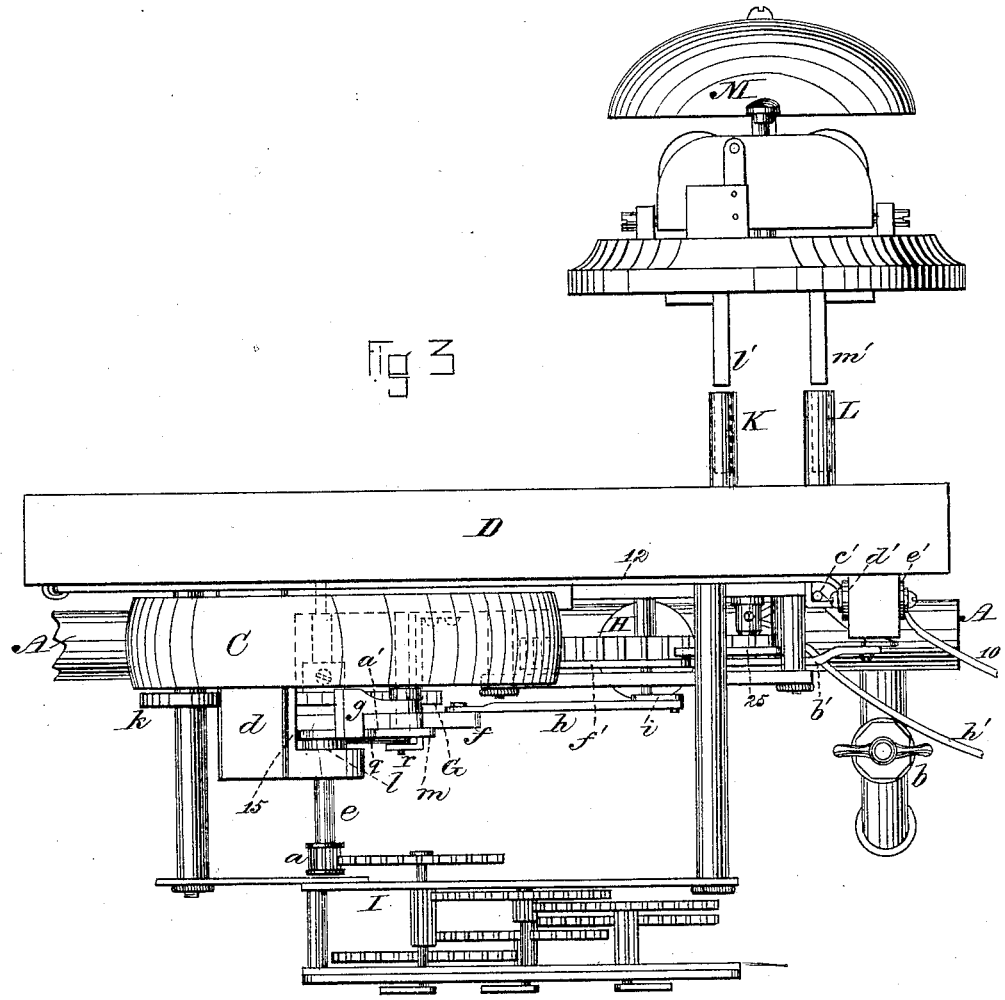

Figure 1 is a front elevation of my improved apparatus. Fig. 2 is a similar elevation with the registering mechanism removed to show the mechanism behind it. Fig. 3 is a plan of the apparatus.

My invention relates to an improved apparatus for registering the quantity of water or other fluid passing through a pipe, in which the varying pressure of the fluid within the said pipe as it is drawn therefrom is caused to operate a compensating mechanism which controls the operative mechanism of the registering device; and my invention consists in a novel method of registering the quantity or volume of fluid passing through a pipe, as hereinafter set forth, and in certain combinations of parts and details of construction, as hereinafter set forth and specifically claimed, whereby an effective and reliable apparatus is obtained by which the flow of the fluid can be registered at any desired distance from the pipe through which it flows, and by means of which any waste or unnecessary flow of the fluid can be readily detected without the knowledge of the occupants of the premises in which the apparatus is located.

In the said drawings, A represents a service-pipe through which water or other fluid is supplied to the point where it is to be used, and from which it may be drawn through a valve or stop-cock, $b$, located in any desired position.

B is a branch pipe of any suitable length, which communicates with the pipe A and is provided at its upper end with a "Bourdon" spring, C, the purpose of which will be presently described. This hollow spring C is similar in every respect to those used in Bourdon steam or water gages, and as its action under pressure is well known it will not be further described.

Within bearings in a frame-work, $d$, secured to a fixed support, D, is mounted a horizontal shaft, $e$, on which is secured a toothed wheel, G, and upon this shaft $e$ is pivoted a bell-crank or carrier, $f$, to one arm of which is pivoted a pawl, $g$, which engages with the toothed periphery of the wheel G. To the other arm of the bell-crank $f$ is pivoted a connecting-rod, $h$, which receives motion from the crank-arm $i$ of an independent electromotor, H, and thus as the rod $h$ is reciprocated the bell-crank $f$ will be rocked or vibrated, causing the pawl $g$ to be alternately advanced and retracted, its free end resting upon and being adapted to engage with the teeth upon the periphery of the wheel G. As the pawl $g$ is retracted its free end will ride over the said teeth; but as it advances it will at once engage with the teeth of the wheel G, and cause it to rotate with its shaft $e$ a distance equal to the throw of the pawl $g$, the motion of the shaft $e$ being communicated by a pinion, $a$, at its outer end to a train of gears within a casing, I, which contains any one of the usual and well-known mechanisms for registering the consumption of fluid and indicating said registration upon a dial or dials.

$k$ is a spring-retaining pawl, which engages with the teeth of the wheel G and prevents it from having any backward movement.

The independent electromotor H here shown, by means of which the wheel G is rotated, is of the description known as the "Lacour" electromotor; but any other suitable electromotor may be employed instead; or, if preferred, clock-work may be substituted; or, in fact, any suitable motor may be employed for the purpose of actuating the bell-crank $f$.

I will now describe the compensating mechanism which controls the action of the pawl $g$ upon the teeth of the wheel G in accordance with the different degrees of pressure of the fluid in the pipe A, which vary as the cock $b$ is opened to a greater or less extent in drawing the fluid from the pipe A, the pawl being held by the said mechanism either entirely out of contact with the teeth of the wheel G or allowed to engage therewith during a greater or less portion of its forward movement, whereby the registering mechanism is controlled and caused to register the respective volumes of fluid discharged from the stopcock b under different pressures.

Upon the shaft e is mounted to turn freely thereon a collar, l, having an upwardly-projecting arm provided at its upper end with a segmental plate, m, having its periphery coincident with or parallel to the periphery of the wheel G. This segment-plate m is so formed that a portion of its circumference or periphery is within a horizontal plane below the plane of the teeth of the wheel G, while the remainder of its circumference or periphery is within a horizontal plane or planes lying above or beyond the teeth of the wheel G, for a purpose presently to be described. The collar l is also provided with an arm, n, to which is adjustably pivoted in holes 5 a rod, p, the other end of which is pivoted to an arm, q, projecting from a rock-shaft, r, to a screw-threaded rod, s, projecting from which is adjustably secured, by means of nuts t t, a rod, u, the opposite end of which is pivoted to the free end, w, of the Bourdon spring C, which is moved more or less outward by the pressure of the water or other fluid in the pipe A, with which it is connected, and thus through the connections described the movement of the end w of the spring C will cause the plate m to be moved or rocked in a plane parallel to the wheel G. This plate m, being mounted upon the shaft e, near the wheel G, is adapted to act as a cut-off to the pawl g, the shoulder or raised portion a' lifting the said pawl and holding it out of engagement with the wheel G throughout such a portion of each stroke as may be determined by the position of said cut-off with relation to the pawl g.

The arrangement of the parts is such that when the end w of the Bourdon spring is thrown outward by the pressure of the water or fluid in the pipe A the cut-off or segment plate m is rocked in the direction in which the pawl g moves when it is in engagement with and operating the wheel G. By this movement of the plate m the raised portion a' is brought into such a position that as the pawl g is retracted for the following stroke the said raised portion a' of the plate will intercept and raise the pawl g entirely out of contact with the teeth of the wheel G, when the pawl will, during the remainder of its backward movement, slide upon the raised surface a', and as it is again thrown forward it cannot engage with the teeth of the wheel G until it has moved to that point where the raised portion a' of the cut-off ends, at which point it will drop by its own gravity upon the wheel G, and will instantly engage with one of its teeth and drive said wheel during the remainder of its forward stroke.

When the outlet or cock b is opened and the pressure within the pipes A B and spring C is consequently reduced, the end w of the spring C retracts or is drawn inward toward the center, thereby moving the cut-off plate m in the direction of the arrow, when the pawl g will be caused to engage with the teeth of the wheel G at a point nearer the beginning of its forward movement, and it will therefore rotate the wheel G through a greater arc of revolution. Variations therefore in the position of the end w of the Bourdon spring C, due to differences in the pressure of the fluid in the pipe A, caused by the opening to a greater or less extent of the stop-cock b, and the consequent escape of more or less of the fluid in a given time, will produce a proportional adjustment of the cut-off m, and thereby regulate the rate of movement or rotation of the wheel G, and the consequent registration on the dials, which can, by the proper adjustment of the parts, be made to record the exact quantity of fluid flowing from the outlet b.

In applying my improved meter the normal pressure in the service-pipe A is first ascertained. The lever mechanism which connects the end w of the Bourdon spring C with the cut-off m is then adjusted by means of the nuts t t and holes 5 in the arm n, so that at the aforesaid normal pressure the shoulder or inner end of the raised portion a' of the cut-off plate m will be held tightly against the portion 15 of the frame-work d, which thus acts as a stop to prevent any further movement of the cut-off m in that direction, and when the raised portion or shoulder a' of the cut-off is against the stop 15 it will be impossible for the pawl g to engage with the teeth of the wheel G, and consequently no rotation will be given to the latter by the vibration of the bell-crank f. As soon, however, as the outlet or cock b is opened and the pressure in the pipe A is diminished the end w of the Bourdon spring C will retract itself or approach the center, thus actuating the cut-off plate m, as before described. This same movement of the end of the spring C is caused through a rod, b', connected therewith to operate a lever, c', which brings a spring, d', of a circuit-breaker into contact with a spring, e', and thus electrically connects the wires 10 12 and completes the electric circuit through the electro-magnet of the motor H, which is thus instantly set in motion to operate the bell-crank f and cause the pawl g to move the wheel G at each forward stroke as far as may be permitted by the position of the cut-off plate m, which movement of the wheel G is registered on the dials, as before described, and when the outlet b is closed the movement of the spring C causes a separation of the springs d' and e' of the circuit-breaker, when the electric circuit is broken and the motor H thus stopped. Instead, however, of the motor being run intermittingly and set in action by the movement of the spring C, as described, it may be run continuously, if desired.

The movement of the hand on the first dial does not indicate cubic feet or gallons of fluid flowed; but in the first adjustment the fluid drawn from the cock b is run into a vessel and the total amount in pounds or fractions thereof which may flow during one complete revolution of the first dial-hand is taken for that particular meter, and is the unit by which the whole number of its rotations is to be multiplied to ascertain the total number of pounds run, and from which can be calculated the number of gallons or cubic feet. This unit of one revolution I term a "mete," and this mete may vary with each meter, and as the normal pressure in the pipe may be varied by its location, and this mete is to be marked plainly upon the first dial, or else registered elsewhere for use, the same meter will measure flowing fluid under pressure in a pipe of any size, the normal pressure having first been ascertained and the cut-off plate $m$ adjusted to that pressure and the mete or unit of fluid flowing at one revolution of the first dial-hand ascertained.

A rod or arm, $f'$, is preferably attached to the end $w$ of the Bourdon spring C and connected with a lever, 25, adapted to engage with the toothed wheel of the motor or other portion of its mechanism, for the purpose of starting or stopping it instantaneously when the flow of the fluid commences or ceases.

I do not confine myself to the employment of a Bourdon spring, C, as shown, as it is obvious that any other suitable pressure device connected with the pipe A and with the mechanism for actuating the cut-off plate $m$ may be employed instead—for instance, a diaphragm placed within a casing, a piston arranged within a cylinder, or other suitable contrivance whereby motion is induced by the pressure of the fluid to be measured, and said motion is varied by the increase or decrease of motion caused by the variation of the pressure produced by the flow of the fluid from the outlet.

The electromotor may be operated by a local battery, or the wires 10 $h'$, connected with its electro-magnet, may, if preferred, be connected with wires from a central station, from which latter wires branch wires may be led to any desired number of meters in different locations, each registering independently, and the current be either continuous or made regularly intermittent by the employment of suitable mechanism at the central station in accordance with the description of motor employed.

To provide a means for detecting waste or unnecessary flow, I employ two metallic terminal points, K L, Fig. 3, which are connected with the electric circuit of the motor H by means of wires $i'$ $k'$. These terminal points K L, which are placed near together, may be located outside the premises in which the meter is placed, or in any other convenient and accessible position; and when it is desired by an authorized person to ascertain whether or not the meter is registering and fluid is flowing or going to waste, as is sometimes necessary in dry seasons, it is merely necessary to apply to the metallic points K L a small electric call-bell or sounder, M, or other suitable current-indicating device or means having terminals $l'$ $m'$ adapted to fit the said points K L, when the circuit will be completed, and if an electric current is passing through the apparatus the fact will be indicated, thereby showing that the meter is in action and fluid flowing through the pipe. The wires and the circuit-breaker may, however, be so arranged and operated that the current will pass to the terminals K L only when the meter is not in action, in which case the absence of an electric current will indicate the flow of the fluid.

The above-described apparatus, besides being adapted to measure the volume or flow of water or other liquid through a pipe, may be employed to advantage for measuring the volume or flow of gases.

The above-described apparatus differs in construction and mode of operation from any meter for measuring liquids heretofore constructed, inasmuch as it is a dry meter, no water or liquid passing through the apparatus, which can consequently be located at any desired distance from the pipe through which the water is flowing, it being merely necessary that the branch pipe B, to which the pressure device is applied, should extend to the point where the meter is located.

What I claim as my invention, and desire to secure by Letters Patent, is—

1. In a meter, the combination of a registering-train having indicating-dials, a mechanism for actuating the same, an independent motor connected with and adapted to operate said mechanism, a cut-off or compensating device for governing the action of said mechanism, a pressure device controlling the movement of the cut-off, and adapted to be connected with the pipe through which flows the liquid to be measured, and receiving motion from the varying pressure of the said fluid, and a connection, substantially as described, between said pressure device and the cut-off or compensating device, whereby the action of the mechanism is regulated and the movements of the registering-train controlled in accordance with the pressure of the liquid in the pipe, substantially as and for the purpose set forth.

2. In a meter, the combination of an independent motor, a pawl mounted on a rocking arm actuated by said motor, a toothed wheel driven by said pawl and connected with a registering-train having indicating-dials, and a cut-off or compensating device for regulating the active stroke of the pawl and the consequent amount of movement of the registering-train, said cut-off being controlled by the movements of a pressure device connected with the pipe through which flows the liquid to be measured, substantially as described.

3. In a meter, the combination of an independent motor, a pawl, $g$, mounted on a vibrating carrier actuated by said motor, a toothed wheel, G, driven by said pawl and secured to a shaft, $e$, connected with the registering train or mechanism, a retaining-pawl, $k$, applied to the wheel G, a rocking cut-off,

*m*, carried on an independent mounting, and having a portion, *a'*, adapted to intercept the pawl *g* and retain it out of contact with the teeth of the wheel G, and a pressure device connected with said cut-off and with the pipe through which the fluid is flowing, whereby the action of the pawl is controlled and the movement of the wheel G correspondingly increased or diminished as the pressure of the fluid in the pipe varies, substantially as and for the purpose set forth.

4. In a meter, the combination of an independent motor, a mechanism driven thereby for actuating the registering-train, a cut-off or compensating device for controlling the action of said mechanism, and a pressure device consisting of a Bourdon spring connected with said cut-off and with the pipe through which flows the fluid to be measured, all operating substantially in the manner and for the purpose described.

5. In a meter, the combination, with a pressure device connected with the pipe through which flows the fluid to be measured, of the cut-off *m*, connected with said pressure device by a mechanism made adjustable by means, substantially as described, and the stop 15 for limiting the movement of the cut-off *m* in one direction, all constructed to operate substantially in the manner and for the purpose set forth.

6. In a meter, the combination, with a registering-train having indicating-dials and mechanism for operating the same, of an independent electromotor for actuating said mechanism and a cut-off or compensating device actuated by a pressure device adapted to be connected with the pipe through which flows the fluid to be measured, substantially as set forth.

7. In a meter, the combination, with the registering mechanism, an independent motor for actuating the same, a cut-off or compensating device, and a pressure device regulated by the cut-off and connected with the pipe through which flows the fluid to be measured, of the electric terminals K L, connected by wires *i' k'* with an electric circuit passing through the apparatus, whereby the fact that the meter is in operation can be determined and waste or unnecessary flow of the fluid thereby detected by connecting said terminals with a current-indicating device, substantially as described.

8. In a meter, the combination, with the motor for actuating the registering mechanism and the pressure device for operating the cut-off or compensating device, of the lever 25, connected with the pressure device and adapted to start or stop the motor, substantially as set forth.

Witness my hand this 16th day of June, A. D. 1884.

J. CULLEN AYER.

In presence of—
P. E. TESCHEMACHER,
W. J. CAMBRIDGE.